US00RE43809E

(19) United States
(12) Reissued Patent
Krstulich

(10) Patent Number: US RE43,809 E
(45) Date of Reissued Patent: Nov. 20, 2012

(54) PERSONAL ITEM REMINDER

(75) Inventor: Zlatko Krstulich, Ottawa (CA)

(73) Assignee: Alcatel Lucent, Paris (FR)

(21) Appl. No.: 12/466,150

(22) Filed: May 14, 2009

Related U.S. Patent Documents

Reissue of:
(64) Patent No.: 7,323,988
Issued: Jan. 29, 2008
Appl. No.: 11/014,181
Filed: Dec. 17, 2004

(51) Int. Cl.
*G08B 13/14* (2006.01)

(52) U.S. Cl. ..... 340/572.1; 340/539.13; 340/539.21; 340/539.22; 340/539.23; 340/539.32; 340/572.2; 340/572.3; 340/686.1; 235/385

(58) Field of Classification Search ..... 340/572.1, 340/539.13, 539.21, 539.22, 539.23, 539.32, 340/572.2, 572.3, 686.1, 572.4, 10.2; 235/385, 235/451, 492
See application file for complete search history.

(56) References Cited

U.S. PATENT DOCUMENTS

| | | | | |
|---|---|---|---|---|
| 6,331,817 | B1 | 12/2001 | Goldberg | |
| 6,853,303 | B2 * | 2/2005 | Chen et al. | 340/573.1 |
| 6,900,731 | B2 * | 5/2005 | Kreiner et al. | 340/572.1 |
| 6,982,640 | B2 * | 1/2006 | Lindsay et al. | 340/540 |
| 7,002,473 | B2 * | 2/2006 | Glick et al. | 340/572.1 |
| 7,034,684 | B2 * | 4/2006 | Boman et al. | 340/568.1 |
| 7,046,141 | B2 * | 5/2006 | Pucci et al. | 340/539.32 |
| 7,064,663 | B2 * | 6/2006 | Pucci et al. | 340/539.32 |
| 7,148,801 | B2 * | 12/2006 | Crabtree et al. | 340/539.13 |
| 7,274,295 | B2 * | 9/2007 | Koch et al. | 340/572.1 |
| 7,319,395 | B2 * | 1/2008 | Puzio et al. | 340/572.1 |
| 7,339,477 | B2 * | 3/2008 | Puzio et al. | 340/572.1 |
| 7,375,632 | B1 * | 5/2008 | Sebanc | 340/572.1 |
| 7,394,364 | B2 * | 7/2008 | Elliott | 340/539.23 |
| 7,420,470 | B2 * | 9/2008 | Koch et al. | 340/572.4 |
| 7,588,185 | B2 * | 9/2009 | Berquist et al. | 235/385 |
| 2002/0113705 | A1 * | 8/2002 | Wallace | 340/568.7 |
| 2002/0158751 | A1 | 10/2002 | Bormaster | |
| 2006/0001542 | A1 * | 1/2006 | Waris | 340/572.1 |

FOREIGN PATENT DOCUMENTS

FR 2815753 A 4/2002

OTHER PUBLICATIONS

Graham-Rowe, Duncan, Tags to Banish Forgetfulness, NewScientist, Aug. 14, 2004.

* cited by examiner

*Primary Examiner* — Travis Hunnings
(74) *Attorney, Agent, or Firm* — Kramer & Amado P.C.

(57) ABSTRACT

A system and method are provided for allowing users to verify the presence of personal items. RFID tags are attached to personal items, and the items are entered into a list. The user makes travel lists from the list of items. When traveling, the user queries the system to determine whether all personal items in the travel list are within range of the system. The system checks for the presence of the RFID tags associated with the items in the travel list. If any RFIDs are not present, the user is alerted. Optionally, the system updates the last known location of items whenever checking for the presence of personal items, so that if an item is not found the user can determine where the item was last known to have been.

15 Claims, 2 Drawing Sheets

PERSONAL ITEM REMINDER

Matter enclosed in heavy brackets [ ] appears in the original patent but forms no part of this reissue specification; matter printed in italics indicates the additions made by reissue.

FIELD OF THE INVENTION

The invention relates to radio frequency identification, and more particular to a system for monitoring the presence of objects.

BACKGROUND OF THE INVENTION

People often carry important items with them, such as passports, plane tickets, watches, medicine, eyeglass cases, security cards, laptop computers, car keys, AC adapter plugs, cameras, cell phones, or even gold pens. When traveling, either long distances or simply to a business meeting, people often pack and unpack these items, or carry the items in more than one bag. These items are therefore sometimes left behind when leaving taxis, packing for vacation, checking out of a hotel, or leaving a business meeting. Even if not left behind, a person must worry about ensuring that all important items are with him or her.

Several systems exist for using radio frequency identification (RFID) for tracking or identifying objects. RFID kits can be purchased, and RFID tags placed on items. The RFID tag can then be identified using a scanner. This presents an opportunity for a system to track personal items automatically, without having to manually search through bags or perform mental checklists.

One system (described in New Scientist, "Tags to Banish Forgetfulness", Aug. 14, 2004, p. 19) proposes installing an RFID detector in a wrist watch, and an RFID interrogator in a separate device near a doorway. The RFID interrogator transmits signals to cause RFID tags to transmit their RFIDs. The RFIDs are detected by the RFID detector in the person's watch. If RFID tags are placed on important items carried by the person, then as the person passes the RFID interrogator the RFID detector within the watch will detect any RFIDs which are missing, and notify the person which if any personal items are absent.

This system requires an external and separate interrogator because of the small size of a watches and the size constraints on RFID interrogators. The system is also passive as far as the user is concerned, because the user is only alerted to missing items when passing fixed RFID interrogators placed at strategic locations. And while useful at notifying the user of missing items, the system cannot assist in locating the missing item or indicating where the item was last detected to narrow the range of possible locations when searching for the item.

SUMMARY OF THE INVENTION

In accordance with one aspect of the invention, a method is provided for detecting the presence of items labeled with radio frequency identification (RFID) tags. A current list of items is stored. In response to a query by a user, detection of the RFID tags of each item in the current list is attempted. For items whose RFID tag is not within detection range, the user is notified that the item is missing. In one embodiment, an item list is stored, the list having at least one record, each record corresponding to an item and storing a name of the item and the RFID of the RFID tag of the item. Travel lists are generated, comprising RFIDs from the item list. One of the travel lists is designated as the current list. The travel list to be designated as the current list may be designated by the user. Alternatively, the current list may be designated based on a current location, each travel list being associated with a geographic region. As yet another alternative, the current list may be designated based on the presence of trigger items within detection range, each travel list being associated with at least one trigger item.

In one embodiment, a current location is determined. The last known location of each item is stored. For items for which the RFID tag is detected as being within detection range, the current location is set as the last known location of the item. For items for which the RFID tag is not detected as being within detection range, the last known location of the item is indicated.

In accordance with another aspect of the invention, another method is provide for detecting the presence of items labeled with radio frequency identification (RFID) tags. An item is selected from an item list. In response to a query by a user, detection of whether the RFID tag of the item is within detection range is repeatedly attempted. If the RFID tag of the item is within detection range, the user is notified.

Apparatus is also provided for implementing the invention. Instructions for implementing the invention may be stored on a computer-readable medium, the instructions being executable by a processor.

The methods and apparatus of the invention allow a person to rapidly and reliably check that all personal items are with them. By designating lists of important objects which have been labeled with an RFID tag, the invention allows a person to make a simple query of a personal communication device in which the invention is implemented, such as a personal digital assistant or a cellular phone, in order to verify that all personal items on a list are with the person. The inherent communication infrastructure (including support for various RF transmitters, receivers, and modulation codes) and superior user interface of personal communication devices (relative to other portable electronic devices such as watches) may be used to simplify implementation and operation of the invention. The invention allows a user to query for missing items at his or her own convenience which, along with placing the RFID interrogator within the same communication device as the RFID detector, allows the user to query for missing items at any location, even when traveling. In one embodiment, the invention also allows the user to determine where a missing item was last detected.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
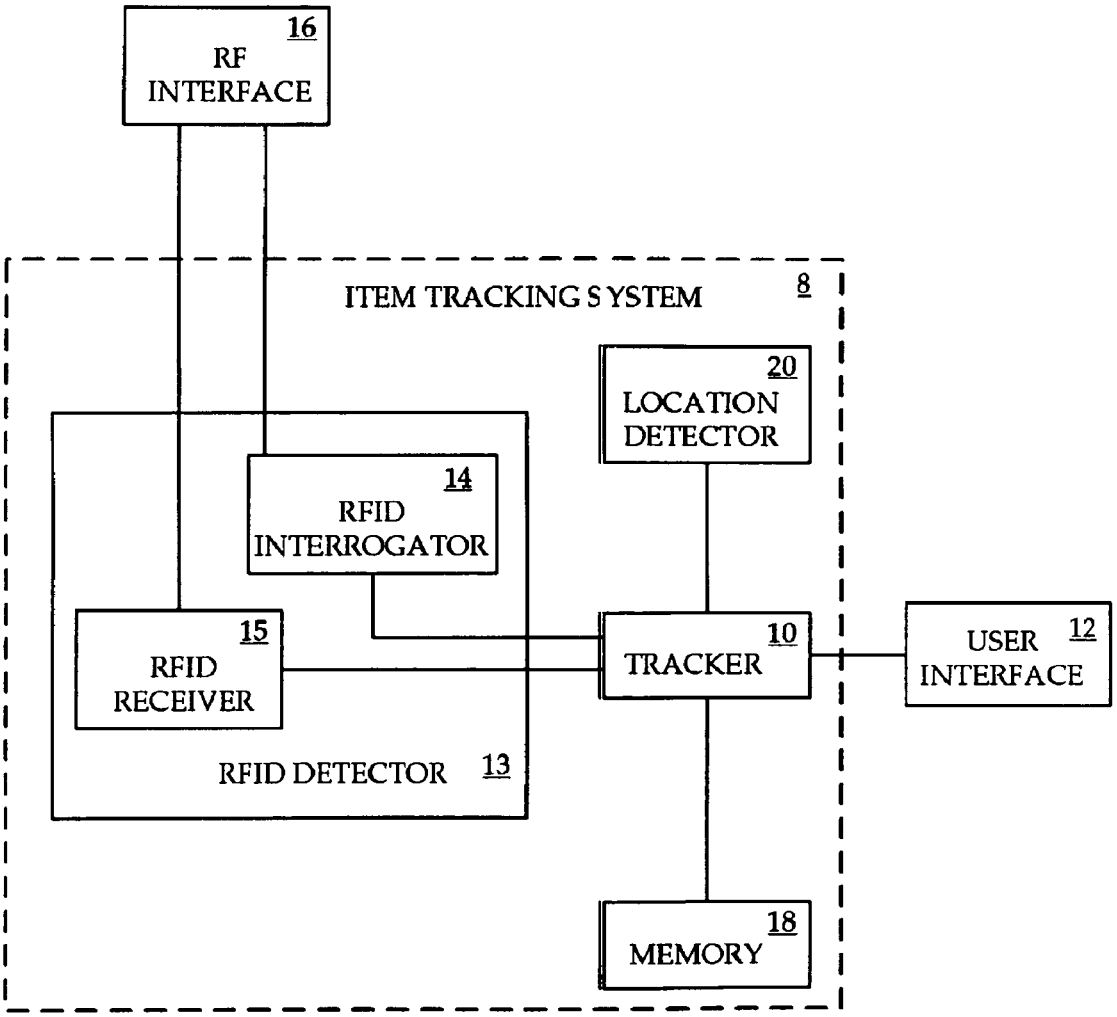
FIG. 1 is a block diagram of an item tracking system according to one embodiment of the invention.

Referring to FIG. 1, a block diagram of an item tracking system according to one embodiment of the invention is shown. The item tracking system 8 includes a tracker 10 accessible to a user through a user interface 12. The tracker 10 is in communication with a Radio Frequency Identification (RFID) detector 13, which includes an RFID interrogator 14 and an RFID receiver 15, each of which is in turn in communication with a radio frequency interface 16. The tracker 10 is also in communication with a memory 18, which may be any sort of memory accessible by the tracker including RAM stored within the tracker itself or a database within a mobility service provider's core network infrastructure. The tracker is also in communication with a location detector 20. The item tracking system 8 is preferably located within a personal digital assistant (PDA) or within a cellular phone, although the system may be located within other ubiquitous personal communication devices such as laptop computers. If within a PDA or a cellular phone, then the RF interface may be the normal RF interface of the PDA or the cellular phone, and the user interface is the normal interface of the PDA or cellular phone. Re-use of the RF interface of the personal communication device is particularly advantageous if the personal communication device employs soft radio, since the software control of RF functions through an extremely versatile RF front end allow the invention to be implemented particularly efficiently. If the personal communication device in which the item tracking system 8 is implemented is a wireless communication enabled laptop computer, the RFID detector 13 may be implemented as a USB, PCMIA, or other commonly deployed plug-in module.

The location detector 20 is any device capable of determining the location of the communication device within which the item tracking system 8 is implemented, such as a GPS. Location detectors are becoming more prevalent, and often mandated, in communication devices such as cellular phones, for example for determining the location of a 911 caller. The location detector 20 may be a self-contained sub-component of the portable device, such as a GPS receiver. Alternatively, the location detector 20 may be a sub-element of a location detection system that relies partly on a mobile radio base station infrastructure for location detection through triangulation.

In the preferred embodiment, the tracker 10 is in the form of software within a processor. More generally, instructions for implementing the tracker 10 may be in the form of any combination of software or hardware, including hardware within an integrated circuit. The processor need not be a single device, but rather the instructions could be located in more than one device.

The tracker 10 presents a menu to the user through the user interface. The menu allows the user to manage an item list stored in the memory 18. The item list contains records, each record corresponding to a personal item. Each record includes an RFID, a name of the personal item, and a location of the personal item. The RFID corresponds to the RFID of an RFID attached to the personal item. The name of the personal item is entered by the user, such as "Wallet" or "Passport". The menu allows the user to enter the RFID associated with a personal item and the name to be associated with the personal item. The location is entered by the tracker, as described in more detail below. The menu allows the user to enter records for new personal items, to change the names of personal items in the item list, to change the RFID of personal items in the item list, or to delete records from the item list.

The menu also allows users to create one or more travel lists. Each travel list has a name and a list of at least one RFID stored in the item list. For each travel list desired by the user, the user enters a name for the travel list, such as "International travel" and selects one or more RFIDs from the item list. The travel list or lists are stored in the memory 18. The menu allows users to create new travel lists, to add personal items to existing travel lists by referencing the RFID of the personal item within the item list, to remove personal items from existing travel list, to delete travel lists, and to rename travel lists. The menu also allows the user to designate one of the travel lists as a current list.

The menu also allows users to determine the last known location of personal items in the item list. The location of personal items is stored in the item list as described below with reference to step 40 of FIG. 2.

To verify the presence of personal items, the user selects the function from the menu displayed on the user interface 12. Alternatively, an icon may be presented on the display of the device in which the tracker is implemented, which allows the user to verify the presence of personal items with a single touch. As a further alternative, a key or key combination on the device in which the invention is implemented may be tied to the tracker, so that the user can access the presence verification function of the tracker simply by using the existing hardware keys on the device.

Figure 2:
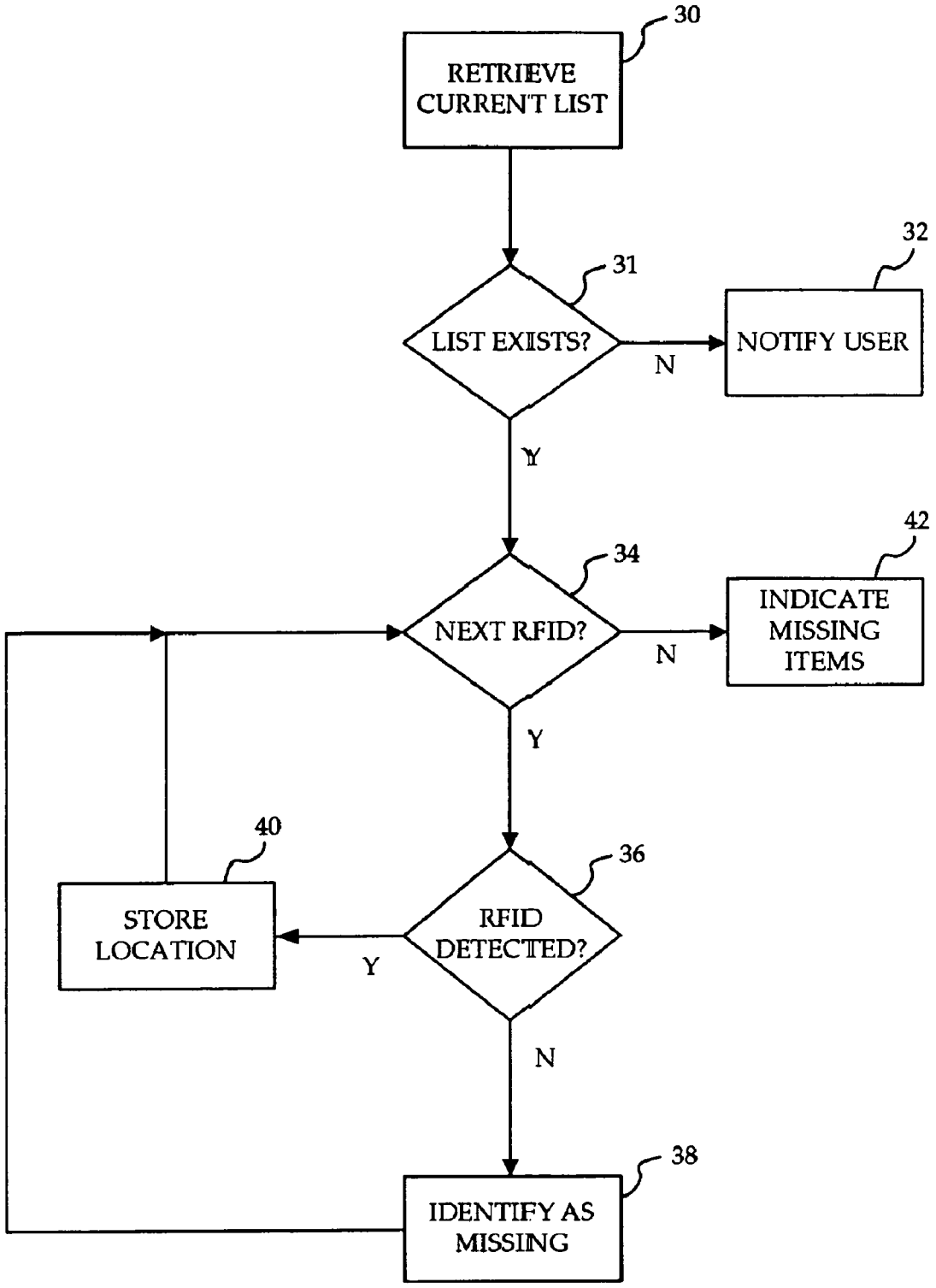
FIG. 2 is a flow chart of a method by which the item tracking system verifies the presence of personal items according to one embodiment of the invention.

Referring to FIG. 2, a flow chart of a method by which the item tracking system 8 verifies the presence of personal items according to one embodiment of the invention is shown. The method is triggered by the user, as described in the preceding paragraph. At step 30 the tracker accesses the current list, previously designated by the user. If at step 31 the tracker determines that no current list has been designated by the user or that the current list contains no RFIDs, then the user is notified of such at step 32.

At step 34 the tracker retrieves the next RFID in the current list, which will be the first RFID in the list when the presence verification is started. At step 36 the tracker passes the RFID to the RFID detector 13. The RFID interrogator 14 within the RFID detector transmits an RF signal through the RF interface 16 in an attempt to prompt RFID tags to transmit their respective RFID. The RFID receiver 15 will detect the presence of the RFID tag if the RFID tag is within range of the RFID receiver, and is unshielded. The preferred detection range of the RFID receiver is 2 meters. If the RFID receiver 15 detects an RFID through the RF interface 16, the RFID returns a signal to the tracker 10 indicating whether the RFID tag was detected.

If at step 36 the tracker 10 learns that the RFID was not detected, then at step 38 the tracker 10 marks the RFID as missing. The tracker then attempts to identify the next RFID within the current list at step 34.

If at step 36 the tracker 10 learns that the RFID was detected, then at step 40 the tracker queries the location detector 20 to determine the location of the device in which the invention is implemented. The tracker 10 stores the location in the item list. The tracker then attempts to identify the next RFID within the current list at step 34.

If the tracker 10 determines at step 34 that there is not a next RFID in the current list, then the tracker 10 has attempted to verify the presence of all personal items within the current list. At step 42 the tracker 10 informs the user through the user interface 12 of the results of the presence verification. The user will either be informed that all personal items within the current list are nearby, or the missing personal items will be identified by the names contained in the item list. At that point, the user may be presented with the option of querying the last known location of the missing personal items.

The invention has been described as monitoring the last known locations of items within the item list. This assumes that the device in which the invention is implemented is equipped with a location detector. While personal communication devices are more frequently being equipped with location detectors, many existing devices have no such location detectors. In an alternative embodiment of the invention, the location detection functions of the invention are either disabled or absent altogether. In such an embodiment, there is no location detector 20, the records in the item list do not contain location information, and the step 40 of FIG. 2 of determining and storing the location of personal items whose RFID tags are detected is omitted.

The invention has been described as defining travel lists and allowing the user to manually select one of the travel lists as the current list. Alternatively, or additionally, the user may define travel lists with respect to geographic locations. The travel lists are stored in memory associated with geographic parameters, such as bounding latitudes and longitudes, or distance from a geographic point. For example, a first travel list could be associated as within 30 km of a given point, and a second travel list associated as more than 30 km from the given point. When the user queries for the presence of personal items, the tracker 10 retrieves the current location of the personal communication device from the location detector 20. The tracker consults the travel lists stored in the memory 18, retrieves the travel list associated with the current location of the personal communication device, and uses that travel list as the current list for determining which personal items are to be scanned for.

As yet another alternative to the user manually selecting one of the travel lists as the current list, each travel list could have an associated trigger personal item or combination of personal items stored in the memory 18. When the user queries for the presence of personal items, the tracker 10 retrieves the trigger item or items for each travel list and uses the RFID detector 13 to determine which if any of the trigger item or items are within range of the RFID receiver 15. If a trigger item or combination of items is found to be present, then the tracker 10 uses the associated travel list as the current list for determining which personal items are to be scanned for. If no trigger item or combination of items are found to be present, then the user can be notified of such and prompted to select a current list manually, or the tracker can use a default travel list as the current list.

The invention has been described as performing a single search for at least one personal item stored in a current list. The invention may additionally provide the ability to locate an item through repeated "pinging". In such an embodiment the user selects a personal item from the item list, effectively creating a current list having only one item. The user selects a locate option, which initiates the item location functionality. In response to the user selection, the tracker determines whether the single item in the current list is within detection range, as described above with respect to step 36 of FIG. 2. If the item is within detection range, the tracker notifies the user of the item's presence through the user interface. If the item is not within detection range, the tracker may notify the user of the item's absence through the user interface, for example by continuing to display a "Searching . . . " icon or message. During this process the user would move about with the mobile device in "ping" mode to various locations where the misplaced item might likely be found. The tracker continues to determine whether the item is within detection range until the user enters a halt input, such as by selecting to stop searching from a menu, turning off the electronic device, or selecting a "stop" key.

The item tracking system 8 may be implemented as a tracker 10 within a cellular phone or a PDA, and an RFID detector 13 implemented as a USB or PCMIA plug-in to a laptop computer. The tracker 10 would communicate with the RFID detector 13 via the laptop computer over a simple communication protocol. While not as convenient as implementing the item tracking system 8 on a single electronic device, such an embodiment still provides the advantages of providing a convenient user interface 12, portability, and the ability of allowing a user to query for the presence of personal items at will rather than passively waiting for a system to alert the user to missing items only when the user passes certain locations equipped with stand-alone RFID interrogators.

The embodiments presented are exemplary only and persons skilled in the art would appreciate that variations to the embodiments described above may be made without departing from the spirit of the invention. Methods that are logically equivalent or similar to the method described above with reference to FIG. 2 may be used to implement the methods of the invention. The scope of the invention is solely defined by the appended claims.

I claim:

1. A system for detecting [the presence of] items labeled with radio frequency (RFID) tags, comprising:

a memory for storing a current list of at least one item;

*a communication device having* an RFID interrogator for sending signals to trigger *the* RFID tags *to transmit signals*;

an RFID receiver for receiving and identifying *the* signals transmitted by *the* RFID tags; [and]

a tracker for receiving a query from a user through a user interface, for instructing the RFID interrogator which of at least one *of the* RFID *tags* is to be searched for, for receiving from the RFID receiver an identification of any items in the current list for which the RFID tag is not within detection range, and for displaying on the user interface an identification of any items for which the RFID tag is not within detection range; and a location detector for determining a current location of the [personal] communication device.

2. The system of claim 1, wherein the user interface, the RFID interrogator, *and* the RFID receiver, [and the tracker] are located within [a single electronic] *the communication* device.

3. The system of claim 2, wherein the [electronic] *communication* device is a personal communication device.

4. The system of claim 1 wherein the [personal] communication device employs a soft radio.

5. The system of claim 1, wherein the tracker is adapted to determine the current location from the location detector, and to store the current location as a last known location for items whose RFID [tag is] *tags are* within detection range.

6. The system of claim 1 wherein the RFID interrogator and the RFID receiver are located within a Universal Serial Bus (USB) plug-in.

7. The system of claim 1 wherein the RFID interrogator and the RFID receiver are located within a Personal Computer Manufacturer Interface Adaptor (PCMIA) plug-in.

8. A method of detecting [the presence of] items labeled with radio frequency identification (RFID) tags, comprising:

storing a current list of at least one item;

*storing a last known location for each item of the current list;*

*in response to detecting the RFID tag is within the detection range determining a current location of the RFID tag and setting the last known location of the item labeled with the RFID tag as the current location of the RFID tag;* in response to a query by a user, detecting whether the RFID tag of each item in the current list is within *a* detection range[;], and for each item whose RFID tag is not within detection range, notifying the user that the item is missing, wherein storing the current list comprises storing the current list in a central database operated by a network provider.

9. The method of claim [8] *15* further comprising [the steps of]:

storing an item list comprising at least one record, each record corresponding to an item and storing a name of the item and the RFID of the RFID tag of the item;

generating at least one travel list comprising RFIDs from the item list; and designating one travel list as the current list.

10. The method of claim 9 further comprising the step of assigning the name of each item in response to input received from a user.

11. The method of claim [9] *8,* wherein each record further stores [a] *the* last known location of the corresponding item[, and comprising the further steps of:

determining a current location;

storing a last known location of each item in the current list;

designating the current location as the last known location of each item in the current list for which the RFID tag is detected as being within detection range; and indicating the last known location of each item in the current list for which the RFID tag is not detected as being within detection range] *of the record.*

12. The method of claim 9 wherein the step of designating one travel list as the current list comprises receiving a designation of one of the travel lists as the current list from the user.

13. The method of claim 9 comprising the further step of associating each travel list with a corresponding geographic region, and wherein the step of designating one travel list as the current list comprises [the steps of]:

determining a current location; and designating as the current list the travel list whose corresponding geographic region corresponds to the current location.

14. The method of claim 9*, further* comprising [the further step of]:

associating each travel list with at least one corresponding trigger item, and wherein the step of designating one travel list as the current list comprises [the steps of]:

determining, for each travel list, whether the RFID tag of the at least one corresponding trigger item is within *the* detection range; and if the RFID tag of the at least one corresponding trigger item of a travel list is within range, designating the travel list as the current list.

*15. The method of claim 11, wherein the notifying the user that the item is missing comprises indicating the last known location of each item in the current list for which the RFID tag is not detected as being within the detection range.*

* * * * *